United States Patent [19]
Tsukuda et al.

[11] Patent Number: 6,010,765
[45] Date of Patent: *Jan. 4, 2000

[54] AROMATIC POLYAMIDE FILM

[75] Inventors: Akimitsu Tsukuda, Kyoto; Kazumasa Yoneyama; Nobuaki Ito, both of Shiga, all of Japan

[73] Assignee: Toray Industries, Inc., Japan

[ * ] Notice: This patent is subject to a terminal disclaimer.

[21] Appl. No.: 08/946,817

[22] Filed: Oct. 8, 1997

Related U.S. Application Data

[62] Division of application No. 08/586,738, filed as application No. PCT/JP95/01247, Jun. 21, 1995, Pat. No. 5,686,166.

[30] Foreign Application Priority Data

Jun. 23, 1994 [JP] Japan .................................. 6-141814
Jul. 4, 1994 [JP] Japan .................................. 6-152360

[51] Int. Cl.$^7$ ..................................... G11B 5/704
[52] U.S. Cl. ..................... 428/141; 428/212; 428/473.5; 428/474.4
[58] Field of Search ..................... 428/141, 212, 428/473.5, 474.4

[56] References Cited

U.S. PATENT DOCUMENTS

| | | | |
|---|---|---|---|
| 3,966,686 | 6/1976 | Asakura et al. | 260/78 |
| 4,645,702 | 2/1987 | Asakura et al. | 428/141 |
| 4,910,068 | 3/1990 | Takagi et al. | 428/141 |
| 5,686,166 | 11/1997 | Tsukuda et al. | 428/141 |

*Primary Examiner*—Stevan A. Resan
*Attorney, Agent, or Firm*—Austin R. Miller

[57] ABSTRACT

The present invention relates to a film made of an aromatic polyamide having excellent running property, durability and output characteristics when combined with a magnetic medium, and having excellent heat resistance, the number of large protrusions per 100 cm$^2$ H2 on one surface of the film and the number of large protrusions per 100 cm$^2$ H3 on the opposite surface of the film satisfy the relationships of:

$H2 \leq 50$ $2 \leq H3 \leq 100$, and the tensile Young's modulus E20 at 20° C. in at least one direction and the tensile Young's modulus E100 at 100° C. in the same direction satisfy the relationships of:

$E20 \geq 800$ kg/mm$^2$ $0.5 \leq E100/E20$.

8 Claims, No Drawings

AROMATIC POLYAMIDE FILM

RELATED CASE

This is a divisional application out of parent application Ser. No. 586,738, filed Feb. 12, 1996 which was the National stage of International Application No. PCT/JP95/01247 Jan. 21, 1995, now allowed U.S. Pat. No. 5,686,166. This application is directed to the aromatic polyamide film itself, independently of the disclosed magnetic recording medium.

TECHNICAL FIELD

The present invention relates to an aromatic polyamide film capable of a variety of uses, including an image transfer material for thermal recording film, a base film for flexible print circuit and a base film for a magnetic recording medium, particularly, a film having excellent running property, durability and output characteristics when combined with a magnetic medium and having excellent heat resistance.

BACKGROUND ART

Recently, films used in video cameras are more and more often used outdoors. Further, there is a demand to make the size of the video camera small and to prolong the recordable time. Still further, there is a demand to use film to carry external memory of computers. Thus, a film having a small thickness, which has excellent durability, excellent running property and output characteristics under severe conditions, is demanded.

Magnetic recording media comprising a polyester film and a magnetic layer formed thereon by coating a ferromagnetic or metal powder are known (e.g., Japanese Laid-open Patent Application (Kokai) Nos. 61-26933 (1986) and 60-66319 (1985)). Japanese Laid-open Patent Application (Kokai) No. 62-62424 (1987) discloses a magnetic recording medium comprising an aromatic polyamide film having different Young's moduli in the longitudinal and transverse directions.

However, the above-mentioned magnetic recording media based on a polyester film or an aromatic polyamide film have drawbacks in that although there are no problems when they are used under normal temperature, their running properties and output characteristics are poor and drop out occurs when they are used at high temperatures. This is because the heat resistance of the base film is not sufficient or the surface properties and running property of the base film are not satisfactory.

An example wherein conditions of surface large protrusions of a non-magnetic material are defined is described in Japanese Laid-open Patent Application (Kokai) No. 6-195679 (1994), in which the number of large protrusions H2 on the back coat side of the film is defined as $H2 \leq 50$ protrusions/100 cm². Japanese Laid-open Patent Application (Kokai) No. 63-146941 (1988) discloses an example wherein $H2 \leq 100$ protrusions/25 cm² and Japanese Laid-open Patent Application (Kokai) No. 59-203232 (1984) discloses an example wherein $(H3-H2) \leq 200$ protrusions/mm².

However, with the film disclosed in Japanese Laid-open Patent Application (Kokai) No. 6-195679 (1994), although the number of large protrusions on the back coat side of the film is defined, the number of large protrusions on the side on which the magnetic layer is to be formed is not defined, so that the magnetic medium does not attain sufficient output characteristics and running property. With the magnetic recording media disclosed in Japanese Laid-open Patent Application (Kokai) Nos. 63-146941 (1988) and 59-203232 (1984), the base film is restricted to polyester films and the number of large protrusions is large, so that they have drawbacks in that the running properties and output characteristics are poor when they are used at high temperatures.

A magnetic recording medium employing a base in which the ratio of the Young's modulus at 90° C. E90 to the Young's modulus at room temperature ERT is adjusted within the range of $1.0 \geq E90/ERT \geq 0.6$ is disclosed in Japanese Laid-open Patent Application (Kokai) No. 64-53330 (1989). However, the number of protrusions on the surface of the base is not defined, so that sufficient output characteristics as a high density magnetic recording medium cannot be obtained.

An aramide film having a dimensional change under a load of 1 kg/mm² at 200° C. for 5 minutes is not more than 5% is shown in Japanese Laid-open Patent Application (Kokai) No. 63-28695 (1988). However, this film contains 10–40% of carbon black and is thus largely different from that of the present invention.

The present inventors intensively studied the cause of these drawbacks to discover that the cause of the drawbacks resides in the heat resistance of the film and in the number of large protrusions on the surface of the other side of the base film, thereby reaching the present invention.

DISCLOSURE OF THE INVENTION

An object of the present invention is to overcome these problems and to provide an aromatic polyamide film having excellent running property, durability and output characteristics when used with a magnetic recording layer, even under severe conditions such as high temperature and repeated running, by exploiting the excellent heat resistance and high rigidity of aromatic polyamides and by defining the surface characteristics of the film.

That is, the present invention provides film made of an aromatic polyamide. The number of surface large protrusions H2 on the surface of the film and the number of surface large protrusions H3 on the surface of the side of the film opposite to the surface on which large protrusions H2 are defined satisfy the relationships of:

$H2 \leq 50$ $2 \leq H3 \leq 100$, the tensile Young's modulus E20 at 20° C. in at least one direction and the tensile Young's modulus E100 at 100° C. in the same direction satisfying the relationships of:

$E20 \geq 800 \text{ kg/mm}^2$ $0.5 \leq E100/E20$.

BEST MODE FOR CARRYING OUT THE INVENTION

The aromatic polyamide used in the present invention contains the repeating units expressed by the formula (I) and/or (II) preferably in an amount of not less than 50 mol %, more preferably not less than 70 mol %.

Formula (I)

Formula (II)

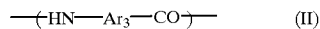

wherein $Ar_1$, $Ar_2$ and $Ar_3$ represent, for example,

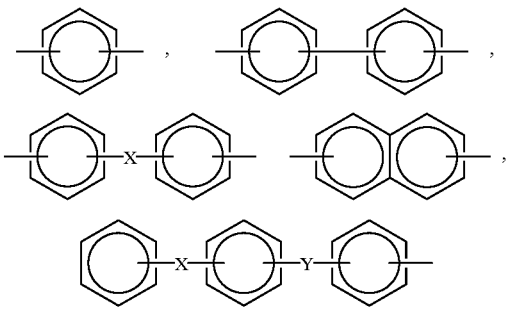

wherein X and Y represent —O—, —CH2—, —CO—, $SO_2$—, —S—, —C(CH$_3$)$_2$— or the like, although $Ar_1$, $Ar_2$ and $Ar_3$ are not restricted to those described above. Further, the aromatic polyamides mentioned above in which a part of the hydrogen atoms on the aromatic rings are substituted with a halogen (especially chlorine); nitro group; $C_1$–$C_3$ alkyl group (especially methyl); $C_1$–$C_3$ alkoxy group; and in which at least a part of the hydrogen atoms in the amide bonds in the polymer are substituted with a substituent, may also be employed in the present invention.

The aromatic polyamide preferably contains para-aromatic amide units in an amount of not less than 50%, more preferably not less than 75% because the stiffness and heat resistance of the film is good. From the view point of making the moisture absorption small, it is preferred that aromatic amide units in which a part of the hydrogen atoms on the aromatic ring are substituted with halogens (especially chlorine) be contained in an amount of not less than 30% based on the total aromatic polyamide.

The aromatic polyamide which may be used in the present invention contains the repeating unit represented by the above-described formula (I) and/or formula (II) in an amount of not less than 50 mol %. The remaining less than 50 mol % may be other repeating units copolymerized or blended with the aromatic amide units.

Further, additives such as lubricants, anti-oxidants and the like may be contained in the aromatic polyamide in an amount not adversely affecting the physical properties of the film.

In the film according to the present invention, it is required that the number of surface large protrusions H2 on one surface of the film satisfy the relationship of:

H2≦50, more preferably H2≦30, still more preferably H2≦20. In the case of magnetic recording medium, if H2 is larger than 50, the surface characteristics of any resulting magnetic recording medium are deteriorated and dropout occurs, so that it is not suited as a film for carrying a high density magnetic recording medium.

It is required that the number of surface large protrusions H3, on the surface of the film of the side opposite to the side on which the number of large pritrusions H2 are defined, satisfy the relationship of:

2≦H3≦100, more preferably 2≦H3≦70, still more preferably 2≦H3≦50. In the case of magnetic recording medium, if H3 is less than 2, the contact resistance between the resulting guide rolls or the like is large, so that its running property is poor. On the other hand, if H3 is more than 100, large protrusions may be transcribed to any associated magnetic layer when the film is made into magnetic tapes, and the large protrusions may influence the surface characteristics of such a magnetic layer in the calendar step in the coating process in the production of coating type magnetic recording media, so that the large protrusions may cause drop out, which is not preferred.

In the film according to the present invention, it is preferred that the number of surface large protrusions H1 on the surface of the film on which the number of large protrusions H2 are defined satisfies the relationship of:

H1≦100, more preferably H1≦70, still more preferably H1≦50, because in case of magnetic recording medium excellent electro-magnetic conversion characteristics are attained.

Further, in the film according to the present invention, it is required that the tensile Young's modulus E20 of the film at 20° C. in at least one direction satisfy the relationship of:

E20≧800 kg/mm$^2$, more preferably E20≧900 kg/mm$^2$, still more preferably E20≧1000 kg/mm$^2$. It is necessary that the film has a high Young's modulus (E20≧800 kg/mm$^2$) in order to withstand the tension exerted during running of tape and at the time of starting and stopping. If the Young's modulus is lower than 800 kg/mm$^2$, the tape is elongated, so that recording/regenerating properties are deteriorated. The fact that the base film has a high Young's modulus (E2≧800 kg/mm$^2$) is also advantageous in processing of any magnetic recording medium because it can withstand the tension exerted during the production of the magnetic recording medium such as in the step of forming the coating layer and the back coat layer.

As long as the tensile Young's modulus E20 of the film in at least one direction at 20° C. is not less than 800 kg/mm$^2$, the film according to the present invention may be more strengthened in the longitudinal direction, transverse direction or in a slant direction. Usually, the base film is more strengthened in the longitudinal or transverse direction. Although the degree of strengthening is not restricted, in view of the properties such as elongation and tear resistance, it is practical that tensile Young's modulus in the longitudinal direction $E_{MD}$ and tensile Young's modulus in the transverse direction $E_{TD}$ satisfy the following relationship:

0.5≦$E_{MD}$/$E_{TD}$≦2.

In addition, in the film according to the present invention, it is required that the tensile Young's modulus E20 of the film at 20° C. in at least one direction and the tensile Young's modulus E100 thereof at 100° C. in the same direction satisfy the relationship of:

0.5≦E100/E20, more preferably 0.6≦E100/E20, still more preferably 0.7≦E100/E20. If E100/E20 is less than 0.5, heat elongation due to reduction of rigidity of the film occurs when the film is used at high temperature, so that in the case of magnetic recording medium, recording/regeneration properties are deteriorated. The fact that the reduction of Young's modulus at high temperature is small (0.5≦E100/E20) is also advantageous in processing of the film because dimensional change of the tape during a drying step after coating a magnetic layer in the production of coating type magnetic recording media or in the step of forming a thin metal layer in the production of metal evaporated type magnetic recording media.

In the film according to the present invention, the dimensional change of the film in the longitudinal direction after applying a load of 1 kg per 1 mm² at 100° C. for 10 minutes is preferably not more than 2%, more preferably not more than 1.5%, still more preferably not more than 1.0%. In the case of magnetic recording medium the magnetic recording medium based upon the film according to the present invention will be often used in the form of a thin film. Thus, if the dimensional change is not more than 2%, elongation or shrinkage of the tape caused by tension exerted during running of the tape at the time of starting or stopping is reduced when the tape is used at high temperature, so that recording/regeneration properties are improved. Further, the fact that the base film has a high dimensional stability (not more than 2%) to external force is also advantageous in processing of the magnetic recording medium because dimensional changes in the tape during a drying step if the film of this invention is coated in the production of coating type magnetic recording media or in the step of forming a thin metal layer in the production of metal evaporated type magnetic recording media.

Methods for forming a magnetic layer using the film of this invention include wet processes in which a magnetic coating composition prepared by mixing ferromagnetic powder with a binder is applied to the base film; and dry processes such as vapor-deposition process, sputtering process, ion-plating process and the like. Although the method for forming the magnetic layer is not restricted, a wet process will now be described as an example.

The type of the magnetic powder for forming the magnetic layer is not restricted and ferromagnetic powder such as powder of ferric oxide, chromium oxide, Fe, Co, Fe-Co, Fe-Co-Ni, Co-Ni or the like may preferably be employed.

The magnetic powder can be formulated into a magnetic coating composition by mixing the powder with one or more of various binders. As the binder, thermosetting resin-based binders and radiant beam setting resin-based binders are preferred. Dispersing agents, lubricants and anti-static agents, etc. may also be used. For example, a binder comprising vinyl chloride/vinyl acetate/vinyl alcohol copolymers, polyurethane prepolymers and isocyanate may be used.

To give appropriate surface roughness to the film according to the present invention, it is preferred to add particles in the film. Examples of the particles which may be added to the film include inorganic particles such as particles of $SiO_2$, $TiO_2$, $Al_2O_3$, $CaSO_4$, $BaSO_4$, $CaCO_3$, carbon black, zeolite and metals; and organic particles such as silicone particles, polyimide particles, cross-linked copolymer particles, cross-linked polyester particles and Teflon particles. The average primary particle size of the particles contained in the film according to the present invention is preferably 0.005–5 μm, more preferably 0.01–2 μm because both the electromagnetic conversion characteristics and running property are good. The content of the particles contained in the base film is 0.01–5 wt %, preferably 0.05–3 wt %. If the content of the particles is less than the above-mentioned range, the running property of the film is poor, and if the content of the particles is more than the above-mentioned range, electromagnetic conversion characteristics tend to be poor.

The film according to the present invention may be a monolayered film or a laminated film. In cases where the film is a laminated film, the laminated film is preferably constructed such that one surface is the surface in which the number of surface large protrusions H2 satisfies the relationship of H2≦50 and that the surface in which the number of surface large protrusions H3 satisfies the relationship of 2≦H3≦100 is exposed at the side opposite to the surface on which the number of large protrusions H2 are defined because both running property and electromagnetic conversion characteristics are good. In the laminated film, the film according to the present invention and the substrate portion (i.e., the constituent of the laminate film other than the film of the present invention) may be made of the same material or not. Particles may be contained in at least one layer constituting the substrate portion. In this case, preferred type of the particles, preferred average primary particle size of the particles and preferred content of the particles may be the same as described above for the film according to the present invention. The particle size of the particles contained in the substrate portion may preferably be larger than that of the particles contained in the laminated film of the present invention because an appropriate undulation may be given to the surface of the film, so that the running property is further improved.

The thickness of the film according to the present invention is preferably 0.5–50 μm, more preferably 1–20 μm, still more preferably 2–10 μm, because excellent running property and electromagnetic conversion property when used as a magnetic recording media having a small thickness are obtained.

The elongation in at least one direction of the film is preferably not less than 10%, more preferably not less than 20%, still more preferably not less than 30% because the film has appropriate flexibility.

The moisture absorption of the film is preferably not more than 5%, more preferably not more than 3%, still more preferably not more than 2%, because the dimensional change of the film due to fluctuation in humidity is small so that good electromagnetic conversion property may be kept.

In cases where a laminated film is employed, it is preferred that these characteristics be satisfied in the laminate film.

A process for producing aromatic polyamide film will now be described. It should be noted, however, that the process for producing aromatic polyamide film is not restricted thereto.

In cases where the aromatic polyamide is prepared from an acid chloride and a diamine, the aromatic polyamide may be synthesized by solution polymerization in an aprotic organic polar solvent such as N-methylpyrrolidone (NMP), dimethylacetamide (DMAc) or dimethylformamide (DMF), or by interfacial polymerization in an aqueous medium. If an acid chloride and a diamine are used as monomers, hydrogen chloride is produced as a by-product. In cases where the generated hydrogen chloride is neutralized, an inorganic neutralizing agent such as calcium hydroxide, calcium carbonate or lithium carbonate; or an organic neutralizing agent such as ethylene oxide, propylene oxide, ammonia, triethylamine, triethanolamine or diethanolamine may be used. The reaction between an isocyanate and a carboxylic acid is carried out in an aprotic organic polar solvent in the presence of a catalyst.

The polymer solution may be used as the film-forming solution as it is. Alternatively, the polymer is separated from the solution and the polymer is dissolved again in the above-mentioned organic solvent or in an inorganic solvent such as sulfuric acid to form a film-forming solution.

To obtain the aromatic polyamide film according to the present invention, the intrinsic viscosity of the polymer (the value obtained by measuring the viscosity of the solution containing 0.5 g of the polymer in 100 ml of sulfuric acid at 30° C.) is preferably not less than 0.5.

To the film-forming solution, as a solubilizer, an inorganic salt such as calcium chloride, magnesium chloride, lithium chloride, lithium nitrate or the like may be added. The concentration of the polymer in the film-forming solution is preferably about 2–40% by weight.

The particles may be added by thoroughly mixing the particles with a solvent to form a slurry and using the obtained slurry as a solvent for polymerization or for dilution; or the particles may be directly added to the film-forming solution after preparing the film-forming solution.

The film-forming solution prepared as described above is subjected to the so called solution casting process so as to form a film. The solution casting process includes dry/wet processes, dry processes and wet processes. Although the film may be formed by any of these processes, a dry/wet process will now be described as an example.

In cases where the film is prepared by a dry/wet method, the film-forming solution is extruded from a die onto a support such as a drum or an endless belt to form a thin film. The thin film layer is then dried to evaporate the solvent until the thin film acquires self-supporting property. The drying may be carried out at room temperature to 220° C. for not more than 60 minutes, more preferably at room temperature to 200° C. If the drying temperature is higher than 220° C., the number of surface large protrusions H2 may be increased to outside the range defined in the present invention. By controlling the frequency of surface defects of the drum or endless belt used in this drying step, H3 can be controlled within the range defined in the present invention. Preferably, the frequency of surface defects having diameters of not less than 30 $\mu$m is preferably 0.001–0.02 defects/mm$^2$, more preferably 0.002–0.015 defects/mm$^2$.

The film after the above-mentioned dry process is peeled off from the support and subjected to a wet process in which the solvent and impurities contained in the film are removed. The bath is usually an aqueous bath which may contain an organic solvent, inorganic salt or the like in addition to water. However, the bath usually contains water in an amount of not less than 30%, more preferably not less than 50%, and the bath temperatured is usually 0–100° C.

The film after the wet process is then stretched, dried and heat set to prepare a final film.

The film is stretched during the film-forming process so as to attain the mechanical characteristics within the ranges defined in the present invention. The area stretching ratio (the value obtained by dividing the area of the film after stretching by the area of the film before stretching. The area stretching ratio not more than 1 means relaxing) is preferably 0.8–8.0, more preferably 1.1–5.0. It is effective to slowly cool the film after the stretching or the heat set at a rate of not more than 100° C./second.

The film according to the present invention may be a laminate film. For example, when the film is a bilayered film, the polymerized aromatic polyamide solution is halved and different particles are added to the halved portions, respectively, and the resultants are laminated. Laminate films having three or more layers may be prepared in the similar manner. Lamination of the films can be carried out by well-known methods including methods in which the polymers are laminated in a die, methods in which the polymers are laminated in a feed block, and methods in which one layer is first prepared and other layer(s) is(are) laminated thereon.

According to one use of the film, a magnetic layer is formed on the film. The magnetic layer may be formed by any of the above-mentioned wet processes and dry processes. For example, in cases where the magnetic layer is formed by a wet process, although the magnetic layer may be coated by any of the known methods, the method using a gravure roll is preferred in view of the uniformity of the coated layer. The drying temperature after coating is preferably 90 –150° C. A calendar process may preferably be carried out at 25° C. to 150° C.

Thereafter, to further promote the running property, a back coat layer may be formed on the surface of the base film opposite to the magnetic layer by a known method.

After curing the film coated with the magnetic layer, the film is slit to obtain a magnetic recording medium.

The methods for measuring and evaluating characteristics relating to the present invention will now be described.

(1) Number of Surface Large Protrusions (H1, H2, H3)

With a stereoscopic microscope under polarized light, 100 cm$^2$ area of film surface is observed and foreign matters are marked. The heights of the marked foreign matters are determined based on the number of rings of the interference fringe observed with a multiple interference meter. The number of protrusions giving not less than single-ply rings is defined as H1, the number of protrusions giving not less than two-ply rings is defined as H2, and the number of protrusions giving not less than three-ply rings is defined as H3.

(2) Tensile Young's Modulus

Tensile Young's modulus was measured using an instron type tensile tester. The width of the test sample was 10 mm, the gauge length was 50 mm, and the stretching rate was 300 mm/min. The measuring temperatures were 20° C. and 100° C.

(3) Dimensional Change

Label lines are drawn on the film at intervals of 150 mm. The film is then slit to a width of 10 mm to obtain a test sample. The thickness of the test sample is measured with a micrometer and a weight is attached to the sample such that the load is 1 kg/mm$^2$. Under these conditions, the sample is heated in an oven at 100° C. for 10 minutes and the dimensional change is calculated according to the following relationship.

$$\text{Dimensional Change (\%)} \frac{A - B}{A} \times 100$$

(wherein A means the gauge length before heating and B means the gauge length after heating)

(4) Electro-magnetic Conversion Characteristics

A process for producing the magnetic recording medium will be described.

The magnetic layer may be formed by any of the above-mentioned wet processes and dry processes. For example, in cases where the magnetic layer is formed by a wet process, although the magnetic layer may be coated by any of the known methods, the method using a gravure roll is preferred in view of the uniformity of the coated layer. The drying temperature after coating is preferably 90–150° C. A calendar process may preferably be carried out at 25° C. to 150° C.

Thereafter, to further promote the running property, a back coat layer may be formed on the surface of the base film opposite to the magnetic layer by a known method.

After curing the film coated with the magnetic layer, the film was slit. into a width of ½ inch and was mounted in a VTR cassette to obtain a VTR tape. This tape was set in a domestic VTR and Chroma S/N was measured by a color video noise measuring apparatus using 100% Chroma signal generated by a television test wave generator. Using a commercially available tape as a standard, those which showed higher S/N than the standard are marked ¢○", and those which showed lower S/N than the standard are marked "X".

(5) Running Property

A film was slit into the form of a tape having a width of ½ inch. The tape was made to run at 40° C., 80% RH using a tape running tester SFT-700 Model (manufactured by Yokohama System Kenkyujo), and the friction coefficient in the 50th pass was determined according to the following relationship:

$\mu K = 0.733 \log(T2/T1)$ wherein T1 means the tension at the entrance side and T2 means the tension at the exit side. The diameter of the guide was 6 mm, the material constituting the guide was polyoxymethylene (having a surface roughness of about 20–40 nm), the winding angle was 90°, the running speed was 3.3 cm/second and the repeating stroke was 15 cm. In cases wherein the $\mu K$ determined by this measurement was not more than 0.35, the running property was ranked "○", and in cases where the $\mu K$ was more than 0.35, the running property was ranked "X". This $\mu K$ is the critical point which determines the ease of handling of the film when the film is processed into a magnetic recording medium, capacitor, wrapping film or the like.

EXAMPLE

The present invention will now be described by way of examples. However, the present invention is not restricted to these examples.

Example 1

As aromatic diamine components, 80 mol % of 2-chloro-p-phenylenediamine and 20 mol % of 4,4'-diaminodiphenyl ether were dissolved in N-methylpyrrolidone (NMP). To this solution, 100 mol % of 2-chloroterephthalic chloride was added and the mixture was stirred for 2 hours to complete polymerization. The resultant was neutralized with lithium hydroxide to obtain an aromatic polyamide solution having a polymer concentration of 10% by weight and a viscosity of 3000 poise. To this solution, dry silica particles having a primary particle size of 16 nm and a secondary particle size of 0.2 $\mu$m were added in an amount of 2 wt % based on the weight of the polymer.

After filtering the obtained polymer solution through a 5 $\mu$m cut filter, the solution was cast onto a belt having a frequency of surface defects with a diameter of not less than 30 $\mu$m of 0.006 defects/mm$^2$. The solvent was evaporated by heating the solution with hot air at 180° C. for 2 minutes, and the film which acquired self-supporting property was continuously peeled off from the belt. The film was then introduced into water bath having a gradient of concentration of NMP to extract with water the residual solvent and the inorganic salts generated by neutralization. The film was then dried and heat set in a tenter to obtain an aromatic polyamide film having a thickness of 6 $\mu$m. During this process, the film was stretched in the longitudinal and transverse directions at stretching ratios of 1.2 times and 1.3 times the original lengths, respectively. The film was then dried and heat set at 280° C. for 1.5 minutes and then slowly cooled at a rate of 20° C./second.

The numbers of surface large protrusions H2 and H1 in the surface which did not contact the belt were 20 protrusions/100 cm$^2$ and 45 protrusions/100 cm$^2$, respectively, and the number of surface large protrusions H3 in the surface which contacted the belt was 40 protrusions/ 100 cm$^2$. The tensile Young's moduli E20 at 20° C. in the longitudinal and transverse directions were both 1250 kg/mm$^2$, and the ratios E100/E20 of the tensile Young's modulus E100 at 100° C. to the tensile Young's modulus E20 at 20° C. were both 0.72 in the longitudinal and transverse directions. The dimensional change of this film under a load of 1 kg/mm$^2$ was 0.6%.

The running property and electro-magnetic conversion characteristics of this film were measured, both of which were good.

Example 2

After filtering the same polymer as in Example 1 through a 5 $\mu$m cut filter, the solution was cast onto a belt having a frequency of surface defects with a diameter of not less than 30 $\mu$m of 0.002 defects/mm$^2$. The solvent was evaporated by heating the solution with hot air at 200° C. for 2 minutes, and the film which acquired self-supporting property was continuously peeled off from the belt. Thereafter, the same procedure as in Example 1 was followed to obtain an aromatic polyamide film having a thickness of 5 $\mu$m.

The numbers of surface large protrusions H2 and H1 in the surface which did not contact the belt were 30 protrusions/100 cm$^2$ and 60 protrusions/100 cm$^2$, respectively, and the number of surface large protrusions H3 in the surface which contacted the belt was 5 protrusions/ 100 cm$^2$. The tensile Young's moduli E20 at 20° C. in the longitudinal and transverse directions were both 1280 kg/mm$^2$, and the ratios E100/E20 of the tensile Young's modulus E100 at 100° C. to the tensile Young's modulus E20 at 20° C. were both 0.70 in the longitudinal and transverse directions. The dimensional change of this film under a load of 1 kg/mm$^2$ was 0.6%.

The running property and electromagnetic conversion characteristics of this film were measured, both of which were good.

Example 3

The same procedure as in Example 1 was repeated except that the stretching of the film was carried out at a stretching ratio of 1.1 times the original length in the longitudinal direction and at 1.45 times the original length in the transverse direction to obtain an aromatic polyamide film having a thickness of 5 $\mu$m.

The numbers of surface large protrusions H2 and H1 in the surface which did not contact the belt were 20 protrusions/100 cm$^2$ and 45 protrusions/100 cm$^2$, respectively, and the number of surface large protrusions H3 in the surface which contacted the belt was 40 protrusions/ 100 cm$^2$. The tensile Young's moduli at 20° C. in the longitudinal and transverse directions were 900 kg/mm$^2$ and 1640 kg/mm$^2$, respectively, and the ratios E100/E20 of the tensile Young's modulus E100 at 100° C. to the tensile Young's modulus at 20° C. in the longitudinal and transverse directions were 0.75 and 0.70, respectively. The dimensional change of this film under a load of 1 kg/mm$^2$ was 0.6%.

The running property and electromagnetic conversion characteristics of this film were measured, both of which were good.

Example 4

As aromatic diamine components, 60 mol % of p-phenylenediamine and 40 mol % of 4,4'-diaminodiphenyl ether were dissolved in NMP. To this solution, 100 mol % of 2-chloroterephthalic chloride was added and the mixture was stirred for 2 hours to complete polymerization. The resultant was neutralized with lithium hydroxide to obtain an aromatic polyamide solution having a polymer concentration of 10% by weight and a viscosity of 3000 poise. To this solution, dry silica particles having a primary particle size of 16 nm and a secondary particle size of 0.2 µm were added in an amount of 2 wt % based on the weight of the polymer.

After filtering this polymer solution through a 5 µm cut filter, the solution was cast onto a belt having a frequency of surface defects with a diameter of not less than 30 µm of 0.015 defects/mm². The solvent was evaporated by heating the solution with hot air at 180° C. for 2 minutes, and the film which acquired self-supporting property was continuously peeled off from the belt. Thereafter, the same procedure as in Example 1 was followed to obtain an aromatic polyamide film having a thickness of 5 µm.

The numbers of surface large protrusions H2 and H1 in the surface which did not contact the belt were 20 protrusions/10 cm² and 45 protrusions/100 cm², respectively, and the number of surface large protrusions H3 in the surface which contacted the belt was 75 protrusions/100 cm². The tensile Young's moduli E20 at 20° C. in the longitudinal and transverse directions were both 920 kg/mm², and the ratios E100/E20 of the tensile Young's modulus E100 at 100° C. to the tensile Young's modulus at 20° C. were both 0.57 in the longitudinal and transverse directions. The dimensional change of this film under a load of 1 kg/mm² was 1.1%.

The running property and electromagnetic conversion characteristics of this film were measured, both of which were good.

Comparative Example 1

After filtering the same polymer as in Example 1 through a 5 µm cut filter, the solution was cast onto a belt having a frequency of surface defects with a diameter of not less than 30 µm of 0.006 defects/mm². The solvent was evaporated by heating the solution with hot air at 230° C., and the film which acquired self-supporting property was continuously peeled off from the belt. Thereafter, the same procedure as in Example 1 was followed to obtain an aromatic polyamide film having a thickness of 5 µm.

The numbers of surface large protrusions H2 and H1 in the surface which did not contact the belt were 70 protrusions/100 cm² and 130 protrusions/100 cm², respectively, and the number of surface large protrusions H3 in the surface which contacted the belt was 40 protrusions/100 cm². The tensile Young's moduli E20 at 20° C. in the longitudinal and transverse directions were both 1230 kg/mm², and the ratios E100/E20 of the tensile Young's modulus E100 at 100° C. to the tensile Young's modulus E20 at 20° C. were both 0.69 in the longitudinal and transverse directions. The dimensional change of this film under a load of 1 kg/mm² was 0.6%.

Although the running property of this film was good, the electromagnetic conversion characteristics were bad because it had a number of large protrusions.

Comparative Example 2

After filtering the same polymer as in Example 1 through a 5 µm cut filter, the solution was cast onto a belt having frequency of surface defects with a diameter of not less than 30 µm of 0.0001 defects/mm². Thereafter, the same procedure as in Example 1 was followed to obtain an aromatic polyamide film having a thickness of 5 µm.

The numbers of surface large protrusions H2 and H1 in the surface which did not contact the belt were 15 protrusions/100 cm² and 35 protrusions/100 cm², respectively, and the number of surface large protrusions H3 in the surface which contacted the belt was 1 protrusion/100 cm². The tensile Young's moduli E20 at 20° C. in the longitudinal and transverse directions were both 1250 kg/mm², and the ratios E100/E20 of the tensile Young's modulus E100 at 100° C. to the tensile Young's modulus E20 at 20° C. were both 0.72 in the longitudinal and transverse directions. The dimensional change of this film under a load of 1 kg/mm² was 0.6%.

Although the electromagnetic conversion characteristics were good, the running property of this film was bad.

Comparative Example 3

After filtering the same polymer as in Example 1 through a 5 µm cut filter, the solution was cast onto a belt having a frequency of surface defects with a diameter of not less than 30 µm of 0.025 defects/mm². Thereafter, the same procedure as in Example 1 was followed to obtain an aromatic polyamide film having a thickness of 5 µm.

The numbers of surface large protrusions H2 and H1 in the surface which did not contact the belt were 20 protrusions/100 cm² and 50 protrusions/100 cm², respectively, and the number of surface large protrusions H3 in the surface which contacted the belt was 160 protrusions/100 cm². The tensile Young's moduli E20 at 20° C. in the longitudinal and transverse directions were both 1250 kg/mm², and the ratios E100/E20 of the tensile Young's modulus E100 at 100° C. to the tensile Young's modulus E20 at 20° C. were both 0.72 in the longitudinal and transverse directions. The dimensional change of this film under a load of 1 kg/mm² was 0.6%.

Although the running property of this film was good, the electromagnetic conversion characteristics were bad.

Comparative Example 4

As aromatic diamine components, 50 mol % of p-phenylenediamine and 50 mol % of 4,4-diaminodiphenyl ether were dissolved in NMP. To this solution, 100 mol % of pyromellitic anhydride was added to carry out polymerization, thereby obtaining a polyamic acid solution. To this solution, dry silica particles having a primary particle size of 16 nm were added in an amount of 2 wt % based on the weight of the polymer.

After filtering this polymer solution through a 5 µm cut filter, the solution was cast onto a belt having a frequency of surface defects with a diameter of not less than 30 µm of 0.006 defects/mm². The solution was dried with hot air at 180° C. until the film acquired self-supporting property and the film was continuously peeled off from the belt. Thereafter, the film was heat set in a tenter at 420° C. and slowly cooled at a rate of 20° C./second. The stretching ratios were 1.1 times the original length in both the longitudinal and transverse directions. The thickness of the obtained film was 8 µm.

The numbers of surface large protrusions H2 and H1 in the surface which did not contact the belt were 20 protrusions/100 cm² and 45 protrusions/100 cm², respectively, and the number of surface large protrusions H3 in the surface which contacted the belt was 50 protrusions/100 cm². The tensile Young's moduli E20 at 20° C. in the longitudinal and transverse directions were 420 kg/mm² and 430 kg/mm², respectively, and the film had the maximum tensile Young's modulus in the direction shifted clockwise by 35° from the transverse direction. The ratios E100/E20 of the tensile Young's modulus E100 at 100° C. to the tensile Young's modulus E20 at 20° C. in the longitudinal and transverse directions, as well as in the direction shifted clockwise by 35° from the transverse direction, were 0.80. The dimensional change of this film under a load of 1 kg/mm² was 0.6%.

Although the electromagnetic conversion characteristics of this film were good, the running property was poor.

Comparative Example 5

As aromatic diamine components, 100 mol % of 4,4-diaminodiphenylmethane was dissolved in N-methylpyrrolidone (NMP). To this solution, 50 mol % of isophthalic chloride and 50 mol % of terephthalic chloride were added and the mixture was stirred for 2 hours to complete polymerization. The resultant was neutralized with lithium hydroxide to obtain an aromatic polyamide solution having a polymer concentration of 10% by weight and a viscosity of 3000 poise. To this solution, dry silica particles having a primary particle size of 16 nm and a secondary particle size of 0.2 μm were added in an amount of 2 wt % based on the weight of the polymer.

Using this polymer solution, an aromatic polyamide film having a thickness of 6 μm was obtained in the same manner as in Example 1.

The numbers of surface large protrusions H2 and H1 in the surface which did not contact the belt were 20 protrusions/100 cm² and 45 protrusions/100 cm², respectively, and the number of surface large protrusions H3 in the surface which contacted the belt was 40 protrusion/100 cm². The tensile Young's moduli E20 at 20° C. in the longitudinal and transverse directions were both 900 kg/mm², and the ratios E100/E20 of the tensile Young's modulus E100 at 100° C. to the tensile Young's modulus E20 at 20° C. were both 0.46 in the longitudinal and transverse directions. The dimensional change of this film under a load of 1 kg/mm² was 2.2%.

Although the running property of this film was good, the electromagnetic conversion characteristics were bad.

INDUSTRIAL FIELD

The present invention provides an aromatic polyamide film having excellent running property, durability and output characteristics when combined with a magnetic medium even under severe conditions such as high temperature and repeated running, by exploiting the excellent heat resistance and high rigidity of aromatic polyamides and by defining the surface characteristics.

TABLE 1

| | Number of Surface Large Protrusions (protrusions/100 cm²) | | | Tensile Young's Modulus E20 (20° C.) | | Dimensional Change | Electromagnetic Conversion | Running |
|---|---|---|---|---|---|---|---|---|
| | H1 | H2 | H3 | (kg/mm²) | E100/E20 | (%) | Characteristics | Property |
| Example 1 | 45 | 20 | 40 | 1250 | 0.72 | 0.6 | ○ | ○ |
| Example 2 | 60 | 30 | 5 | 1280 | 0.70 | 0.6 | ○ | ○ |
| Example 3 | 45 | 20 | 40 | 900 (MD) 1640 (TD) | 0.75 (MD) 0.70 (TD) | 0.6 | ○ | ○ |
| Example 4 | 45 | 20 | 75 | 920 | 0.57 | 1.1 | ○ | ○ |
| Comparative Example 1 | 130 | 70 | 40 | 1230 | 0.69 | 0.6 | X | ○ |
| Comparative Example 2 | 35 | 15 | 1 | 1250 | 0.72 | 0.6 | ○ | X |
| Comparative Example 3 | 50 | 20 | 160 | 1250 | 0.72 | 0.6 | X | ○ |
| Comparative Example 4 | 45 | 20 | 50 | 450 | 0.80 | 0.6 | ○ | X |
| Comparative Example 5 | 45 | 20 | 40 | 900 | 0.46 | 2.2 | X | ○ |

We claim:

1. A film made of an aromatic polyamide having a number of protrusions H2 on one surface of said film and a number of protrusions H3 on an opposite surface of said film which satisfy the relationships of:

$H2 \leq 50$ protrusions/100 cm²

$2 \leq H3 \leq 100$ protrusions/100 cm², said film further having a tensile Young's modulus E20 at 20° C. in at least one direction and a tensile Young's modulus E100 at 100° C. in the same direction which satisfy the relationships of:

$E20 \leq 800$ kg/mm²

$0.5 \leq E100/E20$.

2. The film according to claim 1, wherein the number of protrusions H1 on said surface of said film on which the number of protrusions H2 are defined satisfies the relationship of:

$H1 \leq 100$ protrusions/100 cm$^2$.

3. The film according to claim 1, wherein the dimensional change of said film after applying a load of 1 kg per 1 mm$^2$ at 100° C. for 10 minutes is not more than 2%.

4. The film according to claim 2, wherein the dimensional change of said film after applying a load of 1 kg per 1 mm$^2$ at 100° C. for 10 minutes is not more than 2%.

5. The film according to claim 1, wherein H2 satisfies the relationship of:

$H2 \leq 30$.

6. The film according to claim 1, wherein H2 satisfies the relationship of:

$H2 \leq 20$.

7. The film according to claim 1, wherein H3 satisfies the relationship of:

$2 \leq H3 \leq 70$.

8. The film according to claim 1, wherein H3 satisfies the relationship of:

$2 \leq H3 \leq 50$.

* * * * *

UNITED STATES PATENT AND TRADEMARK OFFICE
CERTIFICATE OF CORRECTION

PATENT NO.: 6,010,765
DATED: January 4, 2000
INVENTOR(S): Akimitsu Tsukuda, Kazumasa Yoneyama and Nobuaki Ito It is certified that error appears in the above-identified patent and that said Letters Patent is hereby corrected as shown below:

In Claim 1, line 11 (Column 14), please change "$E20 \leq 800 \text{ kg/mm}^2$" to --$E20 \geq 800 \text{ kg/mm}^2$--.

Signed and Sealed this

Seventh Day of November, 2000

Attest:

Q. TODD DICKINSON

*Attesting Officer*  *Director of Patents and Trademarks*